US012546863B2

(12) United States Patent
Bouchene

(10) Patent No.: US 12,546,863 B2
(45) Date of Patent: Feb. 10, 2026

(54) LIGHT SENSOR WITH AN OPTICAL DEVICE AND METHOD OF UTILIZATION

(71) Applicant: STMICROELECTRONICS (GRENOBLE 2) SAS, Grenoble (FR)

(72) Inventor: Salim Bouchene, Seyssinet-Pariset (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 948 days.

(21) Appl. No.: 17/675,659

(22) Filed: Feb. 18, 2022

(65) Prior Publication Data
US 2022/0276343 A1 Sep. 1, 2022

(30) Foreign Application Priority Data

Feb. 26, 2021 (FR) ...................... 2101900

(51) Int. Cl.
G01S 7/481 (2006.01)
G01S 17/04 (2020.01)
G01S 17/89 (2020.01)
(52) U.S. Cl.
CPC ............. G01S 7/4811 (2013.01); G01S 17/04 (2020.01); G01S 17/89 (2013.01)

(58) Field of Classification Search
CPC ........ G01S 7/4811; G01S 17/04; G01S 17/89; G01S 7/4816; G01S 17/08; H10F 55/25; H10F 39/103; H10F 55/255; H01L 25/167
See application file for complete search history.

(56) References Cited

U.S. PATENT DOCUMENTS

| 8,143,608 | B2* | 3/2012 | Yao ........................ G01S 17/48 257/433 |
| 8,748,856 | B2* | 6/2014 | Campbell ............. H10F 55/255 250/221 |
| 2016/0011111 | A1 | 1/2016 | Stoll et al. |
| 2020/0209357 | A1 | 7/2020 | Enenkel |

FOREIGN PATENT DOCUMENTS

CN 106057733 A 10/2016

* cited by examiner

Primary Examiner — Seung C Sohn
(74) Attorney, Agent, or Firm — Seed IP Law Group LLP

(57) ABSTRACT

The present disclosure relates to a light sensor comprising: an optical device comprising a first face configured to receive light and a second face, the device being configured, when the first face receives the light at a first wavelength between 1100 nm and 1600 nm, to convert the received light to the light at a second wavelength between 600 nm and 1000 nm, and to emit the light at the second wavelength through the second face; and at least one pixel having a silicon photoconversion area arranged opposite the second face of the optical device.

20 Claims, 3 Drawing Sheets

LIGHT SENSOR WITH AN OPTICAL DEVICE AND METHOD OF UTILIZATION

BACKGROUND

Technical Field

The present disclosure relates generally to electronic circuits, and more particularly to light sensors such as proximity sensors.

Description of the Related Art

Many known electronic systems comprise a display screen and light sensors, in particular a proximity sensor. This is for example the case of cell phones, also known as smartphones.

In these known electronic systems, the light sensor is arranged on the side of the display that is not configured to emit light towards a user. In other words, the light sensor is arranged on the side of the display that is not configured to display an image to the user. In this case, the sensor is arranged directly under a notch passing through the display or directly under the display when the display does not have such a notch.

Known light sensors, for example known proximity sensors, of the electronic systems described above have various drawbacks.

BRIEF SUMMARY

There is a need to overcome some or all of the disadvantages of known light sensors, for example known proximity sensors, when such sensors are configured to be arranged under a display screen that lacks a notch opposite the sensor.

One embodiment addresses all or some of the drawbacks of known light sensors, such as known proximity sensors.

One embodiment provides a light sensor comprising:
- an optical device comprising a first face configured to receive light and a second face opposite the first face, the device being configured, when the first face receives light at a first wavelength between 1100 nm and 1600 nm, to convert the received light to light at a second wavelength between 600 nm and 1000 nm, and to emit the light at the second wavelength through the second face: and
- at least one pixel with a silicon photoconversion area arranged opposite the second face of the optical device.

According to one embodiment, the sensor further comprises a laser source configured to emit light at the first wavelength.

According to one embodiment, the laser source is configured to emit light in a direction orthogonal or transverse to the planes of the first and second faces of the optical device.

According to one embodiment, the sensor comprises a first integrated circuit chip comprising the said at least one pixel.

According to one embodiment, the sensor further comprises a protective case in which the first chip and the laser source are arranged, the housing comprising a first aperture facing the at least one pixel, a second aperture facing the laser source, and at least one partition configured to optically isolate the first chip and the laser source from each other.

According to one embodiment, the sensor comprises a second integrated circuit chip comprising additional pixels, and a protective housing in which the first and second chips and the laser source are arranged, the housing comprising a first aperture facing the said at least one pixel, a second aperture facing the laser source, a third aperture facing the additional pixels, the housing further comprising partitions configured to optically isolate the chips and the laser source from each other.

According to one embodiment, the optical device is part of the first chip.

According to one embodiment, the optical device is arranged in the first aperture.

According to one embodiment, the optical device comprises nanoparticles configured to emit light at the second wavelength when receiving light at the first wavelength.

One embodiment provides an electronic system comprising a sensor as described and a display screen, the display screen comprising a first side and a second side parallel to each other, the first side of the screen configured to emit light to a user and the second side of the screen facing the first side of the optical device of the sensor, the screen preferably being an organic light emitting diode, OLED, screen.

According to one embodiment, the system is a smartphone.

One embodiment provides a method comprising:
- receiving, at a first side of an optical device of a sensor, light at a first wavelength between 1100 nm and 1600 nm.
- converting, with the optical device, the light at the first wavelength to light at a second wavelength between 600 nm and 1000 nm and emitting the light at the second wavelength from a second face of the optical device opposite the first face; and
- receiving the light at the second wavelength through at least one pixel of the sensor comprising a silicon photoconversion area arranged opposite the second face.

According to one embodiment, the method further comprises emitting, by a laser source of the sensor, the light at the first wavelength.

According to one embodiment, the sensor belongs to an electronic system and is arranged under a display screen of the electronic system, wherein light emitted from the laser source passes through the screen before being reflected, and wherein the reflected light passes through the screen before reaching the first side of the optical device.

According to one embodiment, the sensor is a sensor as described.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and preferably within 5%.

Figure 1:
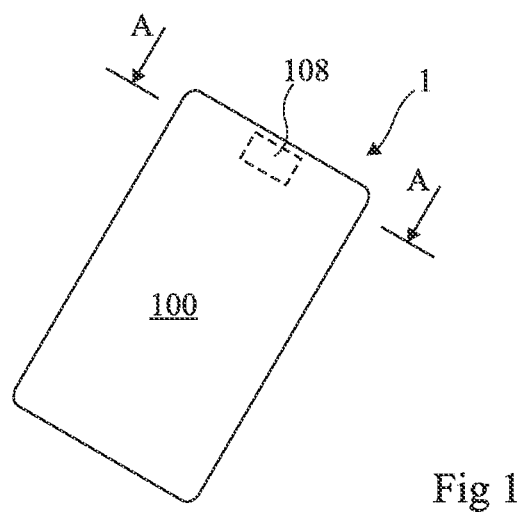
FIG. 1 represents, in a schematic manner, an example of an electronic system of the type to which the described embodiments apply.
Figure 2:
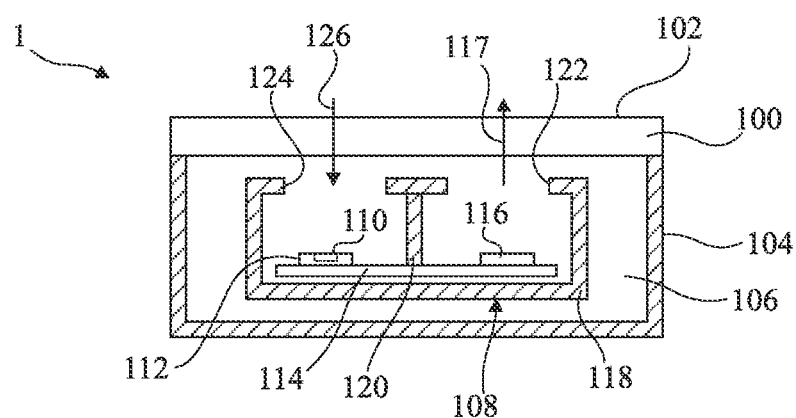
FIG. 2 represents a cross-sectional view of the electronic system of FIG. 1.

FIG. 1 is a top view of an example of an electronic system 1 of the type to which the described embodiments apply, with FIG. 2 being a cross-sectional view taken in a plane AA of FIG. 1. In the example of FIGS. 1 and 2, the system 1 is a smartphone.

The phone 1 comprises a display screen 100, such as an Organic Light-Emitting Diode, OLED, screen, although the present description also applies to a Liquid Crystal Display, LCD. Preferably, the display 100 is a touch screen.

The display 100 lacks a notch passing through the display 100, unlike many known displays that comprise a notch to let light from and to a light sensor arranged below the display screen. Thus, as illustrated in FIGS. 1 and 2, the display screen 100 can occupy almost the entire main face 102 of the phone 1, i.e., the face that faces towards a user of the phone 1.

As shown in FIG. 2, the phone 1 comprises a housing 104 mounted integrally with the screen 100. The housing 104 and the display screen 100 form a casing 106 within which most of the electronic components of the phone 1 are arranged.

The phone 1 comprises a light sensor 108 (dotted line in FIG. 1). The sensor 108 is arranged below the display 100. In other words, the display 100 comprises a first face on the side of the face 102 of the phone 1 and the first face is configured to emit light towards a user or to display an image visible to the user, and a second face of the display 100 is parallel and opposite to the first face of the display 100. The sensor 108 is arranged in the casing 106 such that the second face of the display 100 faces towards the sensor 108.

The sensor 108 comprises at least one pixel 110 provided with a silicon photoconversion area (not detailed in the figures). The photoconversion area is configured to convert received light into charges (electron-hole pairs). In FIG. 2, the sensor 108 comprises only a single pixel 110 (dotted line in FIG. 2). The pixel 110 is part of a first integrated circuit chip 112. The chip 112 is mounted on a carrier 114.

The sensor 108 further comprises a laser source 116 configured to emit light 117 at a wavelength greater than the wavelengths of the visible spectrum but belonging to the silicon absorption spectrum of the photoconversion area of the pixel 110. In other words, the light 117 has a wavelength in the wavelength range of 800 nm to 1000 nm.

The laser source 116 is mounted on the same carrier 114 as the chip 112. The carrier 114 is configured to electrically couple the chip 112 and the laser source 116 to each other. The carrier 114 is, for example, a printed circuit board, PCB.

The sensor 108 further comprises a housing 118. The chip 112, the laser source 116, and the carrier 114 are arranged within the housing 118.

The housing 118 comprises a partition 120 (e.g., a wall) arranged between the chip 112 and the laser source 116. The partition 120 is configured to optically isolate the chip 112 and the laser source 116 from each other, i.e., to prevent light emitted from the laser source 116 from directly reaching the chip 112 and the pixel 110 of the chip 112.

The housing 118 comprises an aperture 122 aligned with and overlapping the laser source 116. The aperture 122 is configured so that the light 117 emitted from the laser source 116 passes through the aperture 122 before reaching and passing through the screen 100 of the phone 1. The light 117 is emitted from the phone 1 by exiting the housing 118 through the aperture 122 and then exiting the phone 1 by passing through the screen 100.

The housing 118 further comprises an aperture 124 aligned with and overlapping the chip 112 and the pixel 110 of the chip 112. The aperture 124 is configured so that the light 126 passes through the screen 100 from first face (top face as shown in FIG. 2) of the screen 100 to the second face (bottom face as shown in FIG. 2) of the screen 100 can reach the pixel 110 by passing through the aperture 124. In other words, the aperture 124 is configured so that light 126 passing through the screen 100, which is traveling in an opposite direction to that in which the emitted light 117 passes through the screen 100, reaches the pixel 110 of the chip 110 by passing through the aperture 124 in the housing 118.

Thus, in operation, the laser source 116, which may also be referred to as a light source, emits the light 117 that passes through the screen 100, and the light 126 is received by the pixel 110. The light 126 corresponds to ambient light and the light 117 after passing through the screen 100 of which has been reflected back towards the phone 1 by a surface aligned with the screen 100 (e.g., arranged above the screen 100 based on the orientation of the phone 1 as shown in FIG. 2). As an example, by measuring, through the sensor 108, the time taken for the light to travel from the source 116 to this surface, and the path from this surface to the pixel 110, it is possible to determine the distance between the sensor 1 and this surface. In other words, the sensor 108 may be similar to a time of flight (TOF) sensor.

However, known display screens absorb light having a wavelength between 800 and 1000 nm, particularly because known display screens comprise silicon. For example, when the screen 100 is an OLED screen, the screen 100 comprises for example thin film transistors (TFT). These TFT transistors, like the organic light emitting diodes of the screen 100, comprise silicon that absorbs the light 117 and the light 126. As a result, undesirable phenomena can occur. For example, when the light 117 passes through the display 100, the absorption of the light 117 by the silicon of the screen 100 may cause one or more pixels to activate and emit white light, resulting in one or more white spots in the image displayed by the screen 100.

Here, a light sensor is proposed comprising, upstream of a pixel provided with a silicon photoconversion area, an optical device configured to convert light received by it at a wavelength between 1100 nm and 1600 nm into light at a wavelength between 600 nm and 1000 nm, the light converted by the optical device then being received by the pixel. More particularly, the optical device is arranged between a display screen of the type of screen 100 described above, and the pixel.

Because the light received by the pixel has a wavelength between 600 nm and 1000 nm, the silicon photoconversion area allows for the conversion of the light the photoconversion area receives into charges.

Furthermore, because the optical device is configured, when receiving light at a wavelength between 1100 nm and 1600 nm, to convert the received light to light at a wavelength between 600 nm and 1000 nm, this allows the use of a laser source emitting light at a wavelength between 1100 nm and 1600 nm. Now, when light at this wavelength passes through a screen of the type of screen 100 described above, light is not absorbed by the screen, and, more particularly, light is not absorbed by the silicon of the screen, thus avoiding undesirable phenomena associated with the absorption of light by the silicon of the screen.

In addition, a laser source configured to emit light at a wavelength between 1100 nm and 1600 nm has the advantage that it is simpler and less expensive to implement than a laser source emitting light at wavelengths greater than 1600 nm, in particular because the laser source configured to emit light at a wavelength between 1100 nm and 1600 nm can be implemented along with a silicon substrate.

Figure 3:
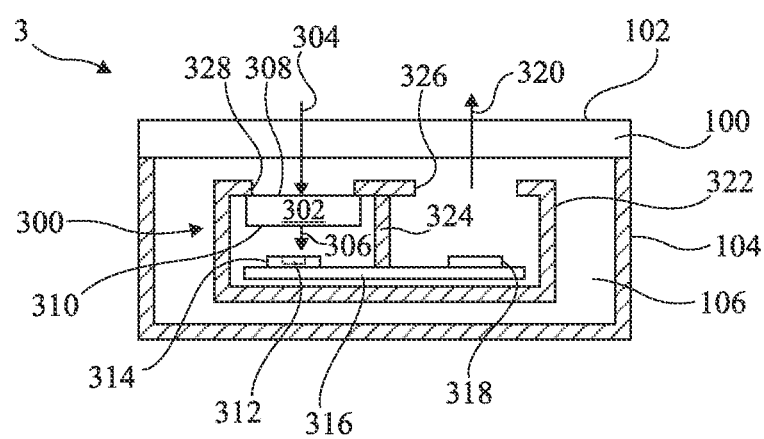
FIG. 3 represents a schematic cross-sectional view of an electronic system comprising a light sensor according to one embodiment.

FIG. 3 represents a schematic cross-sectional view of an electronic system 3 comprising one embodiment of a light sensor as proposed above. The electronic system 3 (e.g., a smartphone) comprises many elements in common with the electronic system 1 of FIG. 1, and only the differences between these two electronic systems or devices are highlighted herein. In particular, system 3 differs from the system 1 in that it comprises a light sensor 300 instead of the sensor 108 as shown in FIG. 2.

The light sensor 300 comprises an optical device 302 configured to convert received light 304 at a first wavelength between 1100 nm and 1600 nm to the emitted light 306 at a second wavelength between 600 nm and 1000 nm. For example, the device 302 comprises two parallel faces 308 310 and is configured, when it receives the light 304 on the face 308, to convert the light 304 to the light 306 emitted from its face 310. The implementation of the device 302 is within the scope of the person skilled in the art.

According to one embodiment, the device 302 comprises nanoparticles configured to emit the light 306 when receiving the light 304. The selection of these nanoparticles as a function of the value of the first wavelength and the value of the second wavelength is within the ability of the person skilled in the art.

The sensor 300 comprises at least one pixel 312, which may be one of a plurality of pixels 312 even though only one pixel 312 is represented in FIG. 3 by a dotted line in FIG. 3. Each pixel 312 comprises a silicon photoconversion area, for example a photodiode, pinned photodiode or single photon avalanche diode, SPAD. The photoconversion area of each pixel 312 is arranged opposite the optical device 302. The photoconversion area of each pixel is aligned with and overlapped by the optical device 302. In other words, each photoconversion area comprises a face configured to receive light, these respective faces of the photoconversion areas being parallel to and facing the face 310 of the device 302.

According to one embodiment, the one or more pixels 312 are part of a first integrated circuit chip 314. The chip 314 is, for example, mounted on a carrier 316.

According to one embodiment, the sensor 300 further comprises a laser source 318 configured to emit the light 320 at the first wavelength in the range of 1100 nm to 1600 nm. The laser source 318 is configured to emit the light 320 towards a scene, for example when the sensor 300 is used to estimate a distance between that scene and the sensor. As an example, the sensor 300 is used as a proximity sensor to detect whether an element of the scene, for example a user's head, is at a distance from the phone that is less than a threshold distance. For example, the laser source 318 is configured to emit the light 320 in a direction orthogonal or transverse to the planes of the faces 310 and 308 of the optical device 302. In other words, the laser source 318 is configured to emit light in the direction of the screen 100, and more particularly in the direction of the face of the screen 100 that does not display an image (e.g., the lower face of the screen 100 that faces towards the sensor 300 based on the orientation of the electronic system 3 as shown in FIG. 3).

As an example, the laser source 318 comprises at least one vertical-cavity surface-emitting laser diode, VCSEL.

Preferably, the laser source 318 is mounted on the same carrier 316 as the chip 314. The carrier 316 is configured to electrically couple the chip 314 and the laser source 318 to each other. The carrier 316 is, for example, a printed circuit board, PCB, or a silicon interposer, or even a flex PCB.

Preferably, the sensor 300 further comprises a protective housing 322 in which the chip 314, the laser source 318, and the carrier 316 are arranged. In other words, the chip 314, the laser source 318, and the carrier 316 are within the protective housing 322.

The housing 322 comprises a partition 324 arranged between the chip 314 and the laser source 318, the partition 324 being configured to optically isolate the chip 314 and the laser source 318 from each other. In this example, the housing 322 comprises a bottom (at the bottom in FIG. 3), although in other examples not shown, the bottom of the housing 322 is at least partially implemented by the carrier 316. In other words, in some embodiments, the carrier 316 may be at least be a portion of the bottom of the housing 322.

In this example as shown in FIG. 3, since the housing 322 comprises a bottom, the carrier 316 is encased within the housing 322 and is suspended within a cavity of the housing 322 such that the carrier 316 is spaced apart from the bottom of the housing 322. In this example as shown in FIG. 3, the partition 324 is on a surface of the carrier 316 to which the laser source 318 and the chip 314 are mounted or coupled.

The housing 322 comprises an aperture 326 opposite the laser source 318. The aperture 326 is aligned with and overlaps the laser source 318, and the aperture 326 is configured so that the light 320 emitted from the laser source 318 passes through the aperture 326 before reaching, and then passing through, the screen 100.

The housing 322 further comprises an aperture 328 opposite the chip 314, i.e., opposite the pixel(s) 312. The aperture 328 is configured so that light 304 passing through the screen 100 from the first face (e.g., a top face or surface of the screen 100 as shown in FIG. 3) to the second face (e.g., a bottom face or surface of the screen 100 as shown in FIG.

3) can reach the one or more pixels 312 by passing through the aperture 328 and the optical device 302.

According to the embodiment illustrated in FIG. 3, the optical device 302 is arranged to be aligned with the aperture 328 such that the aperture 328 overlaps the optical device 302. For example, the device 302 is integrally mounted with the housing 322 such that the aperture 328 is aligned with and overlaps the optical device 302. The aperture 328 includes a first dimension extending in a direction transverse to the direction of travel of the light 304, and the optical device 302 has a second dimension extending in the direction. As readily shown in FIG. 3, the second dimension of the optical device 302 is greater than the first dimension of the aperture 328. As shown in FIG. 3, the optical device 302 is within a cavity of the housing 322 in which the chip 314 is present as well.

The sensor 300, and, in particular, the one or more pixels 312 are arranged under the screen 100, i.e., opposite the screen 100, and are on the side of the screen 100 that is opposite the face of the screen 100 configured to display an image to a user. In particular, the face 308 of the optical device 302 faces the face of the screen that is opposite to the face of the screen configured to display an image.

In the electronic system 3 (e.g., telephone, cellphone, smartphone, etc.), the operation of the sensor 300 is as follows. The laser source 318 emits the light 320 at the first wavelength towards the screen 100. The light 320 passes through the screen 100 and then propagates beyond the screen 100, outside the electronic system 3. If the light 320 encounters an object or surface, then the light 304 at the first wavelength is reflected back towards the screen 100 from that surface or object After passing through the screen 100, the light 304 reaches the optical device 302, where it is converted into the light 306 at the second wavelength. This light 306, which is emitted from the face 310 of the device 302 towards the one or more pixels 312, is then received by the one or more pixels 312 of the sensor 300 where it is converted into electron-hole pairs in the silicon photoconversion area of the pixels 312. Thus, the light 320 and 304 that passes through the screen 100 when the sensor 300 is in operation is at the first wavelength, and thus does not interfere with the operation of the screen 100. In particular, this light 320 and 304 is not absorbed by the silicon of the screen 100.

In the system 3, in addition to the light 304, the screen 100 receives ambient light, for example, light having wavelengths in the visible range, or put another way, in the wavelength range from 350 nm to 700 nm. This ambient light can pass through the screen 100 and then through the device 302. This ambient light can therefore reach the pixel(s) 312, which is not desirable. Thus, although not shown in FIG. 3, the sensor 300 may comprise an optical filter configured to block visible or ambient light but allow light at the first wavelength to pass. This filter is, for example, arranged on the face 308 of the optical device 302. In some embodiments, the filter may be arranged on the face 310 of the optical device 302.

Preferably, the first wavelength is in the range of 1300 nm to 1380 nm. This is because ambient solar light does not comprise a wavelength in this range. In this way, when the system 3 is used in an environment where the ambient light is sunlight, the light 304 at the first wavelength is only that portion of the light 320 that has been reflected back towards the system 3.

Figure 4:
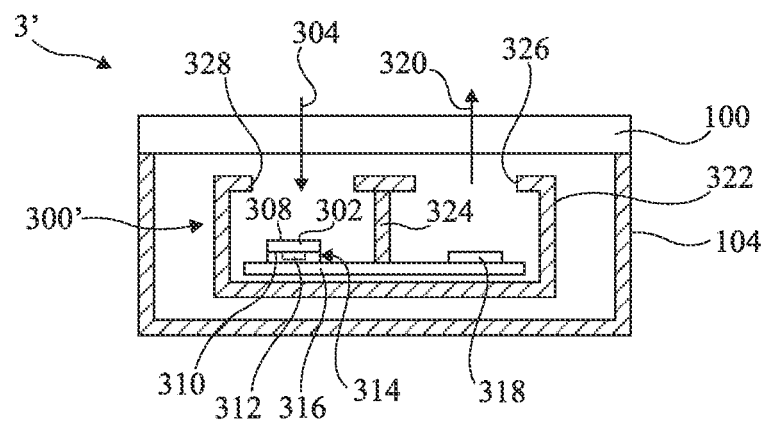
FIG. 4 represents a schematic cross-sectional view of an electronic system comprising a light sensor according to another embodiment.

FIG. 4 shows a schematic cross-sectional view of an electronic system 3' comprising a light sensor 300' according to another embodiment.

The system 3' comprises many elements in common with the system 3, and only the differences between these two systems 3 and 3' are highlighted here.

In particular, the sensor 300' differs from sensor 300 only in the arrangement of the optical device 302 in the sensor. Indeed, in FIG. 4, rather than being arranged in the aperture 328 of the housing 322, the device 302 is part of the chip 314 comprising the one or more pixels 312. For example, when the one or more pixels 312 are implemented in and on a silicon substrate, the device 302 may rest on the silicon substrate.

Although the light 306 is not shown in FIG. 4, the functionality of the device 302 of FIG. 4 is the same or similar to the functionality of the device 302 of FIG. 3. The device 302 comprises the face 308 receiving the light 304, and the face 310 providing light 306 to the pixels 312. The device 302 as shown in FIG. 4 may be identical to the device 302 as shown in FIG. 3, however, the device 302 as shown in FIG. 4 is positioned differently than the device 302 as shown in FIG. 3.

The position of the device 302 in the sensor 300 is not limited to the two embodiments described in connection with FIGS. 3 and 4, and the person skilled in the art is able to arrange this device 302 differently from what has been described, as long as the light 304 having passed through the screen 100 reaches the device 302 where it is converted into the light 306 (FIG. 3) before reaching the one or more pixels 312.

Figure 5:
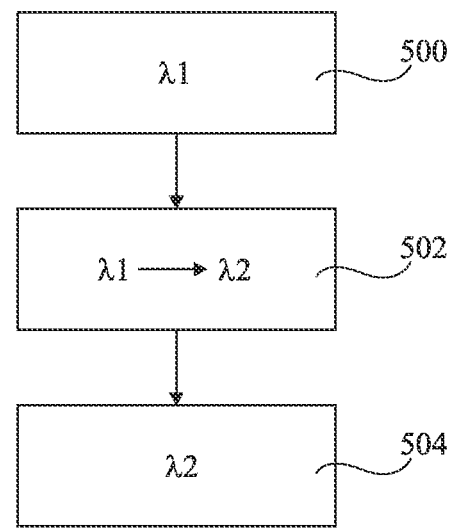
FIG. 5 is a flow chart illustrating an operating mode of a light capture method.

FIG. 5 is a flow chart illustrating a method for implementing a light capture method, for example implemented by the sensor 300 or 300'.

In a step 500 (block "λ1"), the light 304 (FIGS. 3 and 4) at the first wavelength is received by the optical device 302, for example on the face 308 of the device 302.

In a subsequent step 502 (block "λ1→λ2"), the light 304 at the first wavelength is converted to the light 306 (FIG. 3) at the second wavelength by the optical device 302. The converted light 306 is then emitted from the device 302, i.e., the converted light 306 exits the device 302, towards the one or more pixels 312. For example, the light 306 is emitted from the face 310 (FIG. 3) of the device 302.

In a subsequent step 504 (block "λ2"), the light 306 at the second wavelength is received by the one or more pixels 312 each comprising a silicon photoconversion area arranged opposite the device 302, for example opposite the face 310 (FIG. 3) of the device 302.

Although not illustrated in FIG. 5, according to one embodiment, the method comprises a step of emitting the light 320 at the first wavelength from the laser source 318, this step preferably being implemented in parallel with step 500. Furthermore, during the step of emitting the light 320, the light 320 passes through the screen 100, and in step 500, the light 304 received by the device 302 is received after such light passes through the screen 100, in a direction opposite to that in which the light 320 passes through the screen 100.

In addition, although not illustrated in FIG. 5, according to one embodiment where the sensor is a proximity sensor, the method comprises, after step 504, a determination step, from the reading of the one or more pixels 312, whether the amount of light 306 received by the one or more pixels 312 is greater than a threshold. If the amount of light 306 received is greater than the threshold, it means that a substantial portion of the emitted light 320 has been reflected towards the screen by a surface arranged outside the system 3 or 3', and thus that this surface is arranged at a distance from the screen, less than a distance determined by the threshold. Conversely, if the quantity of light 306 received is less than the threshold, this means that a small or zero portion of the light 320 emitted was reflected towards the screen by a surface outside the system 3 or 3', and therefore that this surface is at a distance from the screen greater than the distance determined by the threshold. By way of example, when the phone 3 or 3' detects, by means of the sensor 300 or 300', that a user's ear is close to the screen 100, the phone 3 or 3' may then command a deactivation of the touch function of the screen 100 and/or command a sleep mode of the screen 100.

Figure 6:
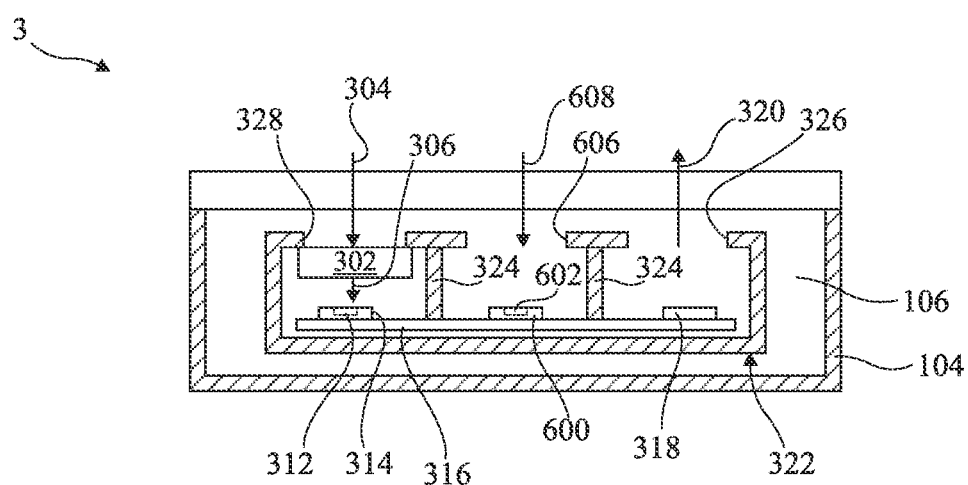
FIG. 6 represents a schematic cross-sectional view of an alternative embodiment of the system of FIG. 3.

FIG. 6 shows a schematic cross-sectional view of an alternative embodiment of the system of FIG. 3.

In this variant, the sensor 300 comprises, in addition to the chip 314 comprising the one or more pixels 312, an integrated circuit chip 600. The chip 600 comprises additional pixels 602. In FIG. 6, a single pixel 602 is represented, as a dotted line, so as not to overload this figure. Preferably, the chip 600 is mounted on the same carrier 316 as the chip 314 and the laser source 318. For example, the carrier 316 is configured to electrically couple the chip 314, the laser source 318, and the chip 600 to each other. By way of example, each pixel 602 comprises, as does each pixel 312, a silicon photoconversion area.

Similar to what has been described in connection with FIGS. 3 and 4, the chips 314 and 600 and the laser source 318 are arranged within the housing 322. As before, the housing 322 comprises the aperture 326 opposite the laser source 318 and the aperture 328 opposite the pixel(s) 312, thus the chip 314. The housing 322 also comprises an aperture 606 opposite the additional pixels 602, i.e., opposite the chip 600. The aperture 606 is configured so that the ambient light 608 from outside the system 3 passing through the screen 100 can be received by the pixels 602 by passing through the aperture 606.

Similar to what has been described in relation to FIGS. 3 and 4, the housing 322 comprises partitions 324 arranged between the chip 314, the chip 600 and the laser source 318. These partitions 324 are configured to optically isolate the chips 314 and 600 and the laser source 318 from each other.

According to one embodiment, the pixels 602 are part of an Ambient Light Sensor, ALS, array. In such an embodiment, the light sensor 300 comprises the pixels 602 belonging to the ambient light sensor, and the pixel or pixels 312 belonging to, for example, a proximity sensor.

The alternative embodiment described in relation to FIG. 6 applies to the sensor 3' described in relation to FIG. 4.

An advantage of the above-described embodiments and variants is that the sensor 300 or 300' may correspond to a monolithic component. For example, the sensor 300 or 300' is provided to a manufacturer of the system 3 or 3' as a single part that matches the shape and dimensions of the housing 322. As an example, electrical connections (not shown in the figures) between the carrier 316 and connection pads (not shown in the figures) arranged outside the housing 322 then allows the manufacturer of the system 3 or 3' to electrically couple the circuits of the sensor 300 or 300' to the other electronic circuits of the system 3 or 3'.

Various embodiments and variants have been described. Those skilled in the art will understand that certain features of these embodiments can be combined and other variants will readily occur to those skilled in the art. In particular, the electronic systems 3 and 3' are not limited to a smartphone. For example, the electronic system 3 or 3' may correspond to an access control device having a touch screen 100 and a proximity sensor 300 or 300' arranged below the screen 100. The proximity sensor 300 or 300' is, for example, used to detect when a surface approaches close to the screen 100, for example, to bring the screen out of a sleep mode when a user's finger approaches the screen 100. More generally, the electronic system 3 or 3' may be any electronic device comprising a light sensor arranged under a screen 100, for example, a distance sensor or a proximity sensor arranged under the screen 100.

Finally, the practical implementation of the embodiments and variants described herein is within the capabilities of those skilled in the art based on the functional description provided hereinabove. In particular, the implementation of the device 302, for example with nanoparticles as described above, is within the reach of the person skilled in the art from the functional indications given above.

A light sensor (300, 300') may be summarized as including an optical device (302) including a first face (308) configured to receive light and a second face (310) at the opposite side to the first face (308), the device (302) being configured, when the first face (308) receives the light (304) at a first wavelength between 1100 nm and 1600 nm, to convert the received light (304) to light (306) at a second wavelength between 600 nm and 1000 nm, and to emit the light (306) at the second wavelength through the second face (310); and at least one pixel (312) with a silicon photoconversion area opposite the second face (310) of the optical device (302).

The sensor may further include a laser source (318) configured to emit the light (320) at the first wavelength.

The laser source (318) may be configured to emit the light in a direction orthogonal to the planes of the first and second faces (308, 310) of the optical device (302).

A first integrated circuit chip (314) may include the said at least one pixel (312).

The sensor may further include a protective housing (322) in which the first chip (314) and the laser source (318) may be arranged, the housing may include a first aperture (328) facing the at least one pixel (312), a second aperture (326) facing the laser source (318), and at least one partition (324) configured to optically isolate the first chip (314) and the laser source (318) from one another.

A second integrated circuit chip (600) may include additional pixels (602), and a protective housing (322) in which the first and second chips (314, 602) and the laser source (318) may be arranged, the housing (322) may include a first aperture (328) facing the said at least one pixel (312), a second aperture (326) facing the laser source (318), a third aperture (606) facing the additional pixels (602), the housing may further include partitions (324) configured to optically isolate the chips (600, 314) and the laser source (318) from each other.

The optical device (302) may be part of the first chip (314).

The optical device (302) may be arranged within the first aperture (328).

The optical device (302) may be arranged within the first aperture (328).

The optical device (302) may include nanoparticles configured to emit light at the second wavelength when receiving light at the first wavelength.

An electronic system (3, 3') may be summarized as including a sensor (300, 300') and a display screen (100), the display screen including a first face (102) and a second face parallel to each other, the first face (102) of the screen (100) being configured to emit light towards a user and the second face of the screen being at the opposite side to the first face (308) of the optical device (302) of the sensor (300, 300'), the screen (100) preferably being an organic light-emitting diode, OLED, screen.

The system (3, 3') may be a smartphone.

A method may be summarized as including receiving (500), at a first face (308) of an optical device (302) of a sensor (300, 300'), a light (304) at a first wavelength between 1100 nm and 1600 nm; converting (502), with the optical device (302), the light (304) at the first wavelength to light (306) at a second wavelength between 600 nm and 1000 nm and emitting the light (306) at the second wavelength through a second face (310) of the optical device (302) at the opposite side to the first face (308); and receiving (504), by at least one pixel (312) of the sensor (300, 300') including a silicon photoconversion area arranged opposite the second face (310), the light (306) at the second wavelength.

The method may further include emitting, from a laser source (318) of the sensor (300, 300'), the said light (320) at the first wavelength.

The sensor (300, 330') may belong to an electronic system (3, 3') and may be arranged under a display screen (100) of the electronic system, the light (320) emitted by the laser source (318) passing through the screen (100) before being reflected, and the reflected light passing through the screen (100) before reaching the first face (308) of the optical device (302).

The sensor (300, 300') may be the sensor.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a carrier including a carrier surface;
an optical device including a first face configured to receive light at a first wavelength between 1100 nm and 1600 nm, and a second face opposite to the first face, the optical device configured to convert the light at the first wavelength to a converted light at a second wavelength between 600 nm and 1000 nm, and the optical device configured to emit the converted light at the second wavelength from the second face;
a first integrated circuit chip on the carrier surface of the carrier, the first integrated circuit chip including at least one pixel with a silicon photoconversion area aligned with and overlapped by the optical device;
a laser source on the carrier surface of the carrier, the laser source configured to emit the light at the first wavelength; and
a protective housing encasing the carrier, the optical device, the first integrated circuit chip, and the laser source, the protective housing including:
a first side and a second side opposite to the first side;
a first sidewall that extends from the first side to the second side, a second sidewall opposite to the first sidewall;
a second sidewall that extends from the first side to the second side;
a first aperture at the first side, the first aperture is aligned with and overlapping the at least one pixel;
a second aperture at the first side, the second aperture is aligned with and overlapping the laser source;
a lower internal surface that extends from the first sidewall to the second sidewall; and
a first partition including an first end spaced apart from the first side, the first end of the first partition is coupled to the carrier surface of the carrier at a region along the carrier surface between the laser source and the first integrated circuit chip, the first partition optically isolating the laser source from the first integrated circuit chip, and the first partition being spaced from the optical device, the first integrated circuit chip, and the laser source, and wherein the first end of the first partition being coupled to the carrier surface of the carrier suspending the carrier within the protective housing and spacing the carrier apart from the lower internal surface.

2. The device according to claim 1, wherein the optical device is coupled to an upper internal surface of the protective housing opposite to the lower internal surface.

3. The device according to claim 1, wherein the laser source is configured to emit the light at the first wavelength in a direction transverse to planes of the first and second faces of the optical device.

4. The device according to claim 1, wherein the protective housing further includes a second partition between the first partition and the second sidewall, the second partition including a second end coupled to the carrier surface of the carrier, and wherein the second end of the second partition being coupled to the carrier surface of the carrier suspending the carrier within the protective housing and spacing the carrier apart from the lower internal surface.

5. The device according to claim 1, further comprising:
a second integrated circuit chip including at least one pixel, the second integrated circuit chip arranged within the protective housing, and
wherein the protective including further includes:
a third aperture aligned with and overlapping the at least one pixel of the second integrated circuit chip; and
a second partition between the first partition and the second sidewall, the second partition is spaced from the first partition, the second partition including a second end coupled to the carrier surface of the carrier, and wherein the second end of the second partition being coupled to the carrier surface of the carrier suspending the carrier within the protective housing and spacing the carrier apart from the lower internal surface, and wherein the second partition along with the first partition are configured to optically isolate the first integrated circuit chip, the second integrated circuit chip, and the laser source from each other, respectively.

6. The device according to claim 5, wherein the optical device is coupled to an upper internal surface of the protective housing opposite to the lower internal surface of the protective housing, and the optical device is aligned with and extends across the first aperture.

7. The device of claim 6, wherein:
the laser source is between the second partition and the second sidewall;
the first integrated circuit chip is between first partition and the first sidewall; and
the second integrated circuit chip is between the first partition and the second partition.

8. The device according to claim 1, wherein the optical device is coupled to an upper internal surface of the protective housing opposite to the lower internal surface of the protective housing, and the optical device is aligned with and extends across the first aperture.

9. The device according to claim 1, wherein the optical device further includes nanoparticles configured to emit light at the second wavelength when receiving light at the first wavelength.

10. A method, comprising:
emitting, from a laser source on a carrier surface of a carrier coupled to a first end of a first partition wall suspending the carrier within a protective housing, a light at a first wavelength between 1100 nm and 1600 nm from a first aperture in the protective housing aligned with and overlapping the laser source;
receiving, at a first face of an optical device coupled to an first internal surface of the protective housing, aligned with and overlapped by a second aperture within the protective housing, overlapping a first chip, and optically isolated from the laser source by the first partition wall, the light at the first wavelength;
converting, with the optical device, the light at the first wavelength to a light at a second wavelength between 600 nm and 1000 nm and emitting the light at the second wavelength through a second face of the optical device opposite to the first face of the optical device; and
receiving, by at least one pixel of the first chip with a silicon photoconversion area aligned with and overlapped by the second face, the light at the second wavelength.

11. The method according to claim 10, further comprising receiving, at a second chip on the carrier surface of the carrier, aligned with and overlapped by a third aperture in the protective housing, and optically isolated from the laser source, the first chip and the optical device by the first partition wall and a second partition wall having a second end coupled to the carrier surface suspending the carrier within the protective housing, an ambient light.

12. The method according to claim 11, wherein:
the first chip belongs to an electronic system and is overlapped by a display screen of the electronic system; and
the light at the first wavelength emitted by the laser source passes through the display screen before the light is reflected off an object external to the electronic system, and reflected light at the first wavelength reflected off the object passes through the display screen before reaching the first face of the optical device.

13. The method of claim 11, wherein:
receiving, at the first face of the optical device overlapping the first chip, further includes passing the light of the first wavelength through the second aperture in the protective housing that overlaps the first face of the optical device; and
receiving, at the second chip, the ambient light further includes passing the ambient light through the third aperture in the protective housing that overlaps the second chip; and emitting, from the laser source, the light at the first wavelength further includes passing the light of the first wavelength through the first aperture in the protective housing that overlaps the laser source.

14. The method according to claim 12, wherein the display screen includes silicon.

15. The method of claim 14, wherein the silicon of the display screen absorbs light having a wavelength between 800 nm and 1000 nm.

16. An electronic system, comprising:
a display screen;
a housing coupled to the display screen;
a cavity at least partially delimited by the display screen and the housing;
a sensor in the cavity, the sensor including:
a protective housing including:
a first side and a second side opposite to the first side, and the first side facing towards the display screen;
a first sidewall that extends from the first side to the second side;
a second sidewall that extends from the first side to the second side, the second sidewall opposite to the first sidewall;
a first partition, including a first end spaced apart from the first side, the first partition extending from the first side towards the second side, and the first partition between the first sidewall and the second sidewall;
a lower internal surface that extends from the first sidewall to the second sidewall;
an upper internal surface that is opposite to the lower internal surface;
a first aperture, at a first side, the first aperture is between the first partition and the first sidewall; and
a second aperture at the first side, the second aperture is between the first partition and the second sidewall;
a carrier including a carrier surface coupled to the first end of the first partition suspending the carrier within the protective housing and spacing the carrier away from the lower internal surface and the upper internal surface;
a first die on the carrier surface of the carrier, in the protective housing, and spaced from the first partition, and the first die is aligned with and overlapped by the first aperture;
a light emitter on the carrier surface of the carrier, in the protective housing, spaced from the first partition, and optically isolated from the first die within the protective housing by the first partition, the light emitter is aligned with and overlapped by the second aperture, and the light emitter is configured to emit a first light with a first wavelength; and
an optical device coupled to the upper internal surface of the protective housing, the optical device is aligned with and overlaps the first die and is aligned with and extends across the first aperture, and the optical device is configured to receive the first light with the first wavelength and emit a second light with a second wavelength different from the first wavelength.

17. The system according to claim 16, wherein:
the first wavelength ranges from 1100-nanometers (nm) to 1600-nm; and
the second wavelength ranges from 600-nm to 1000-nm.

18. The system of claim 17, wherein:
- the display screen includes a silicon material that absorbs light having the second wavelength; and
- the first die is configured to receive and detect light having the second wavelength.

19. The system of claim 16, wherein the protective housing further includes a third aperture and a second partition.

20. The system of claim 19, further comprising a second die optically isolated from the first die and the light emitter by the first and second partitions.

* * * * *